United States Patent
Schaefer et al.

(10) Patent No.: US 9,803,587 B1
(45) Date of Patent: *Oct. 31, 2017

(54) METHOD OF FABRICATING A BONDED CASCADE ASSEMBLY FOR AN AIRCRAFT THRUST REVERSER

(71) Applicant: Spirit AeroSystems, Inc., Wichita, KS (US)

(72) Inventors: Henry A. Schaefer, Wichita, KS (US); Mark A. Wadsworth, Sedan, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/341,459

(22) Filed: Nov. 2, 2016

Related U.S. Application Data

(63) Continuation of application No. 14/305,444, filed on Jun. 16, 2014, now Pat. No. 9,587,582.

(60) Provisional application No. 61/837,032, filed on Jun. 19, 2013.

(51) Int. Cl.
  *F02K 1/72* (2006.01)

(52) U.S. Cl.
  CPC .......... *F02K 1/72* (2013.01); *F05D 2230/23* (2013.01); *F05D 2230/60* (2013.01)

(58) Field of Classification Search
  CPC ... F02K 1/605; F02K 1/72; F02K 1/54; F02K 1/64; F02K 1/70; F02K 1/56; F05D 2230/50; F05D 2230/51; Y02T 50/671; Y02T 50/672
  See application file for complete search history.

(56) References Cited

U.S. PATENT DOCUMENTS

| | | |
|---|---|---|
| 3,794,246 A | 2/1974 | Weise |
| 4,722,821 A | 2/1988 | Vermilye |
| 4,778,110 A | 10/1988 | Sankey et al. |
| 6,557,338 B2 * | 5/2003 | Holme .................. F02K 1/54 239/265.31 |

OTHER PUBLICATIONS

Non-Final Office Action for U.S. Appl. No. 14/305,444, filed Jun. 16, 2014.

* cited by examiner

*Primary Examiner* — Corey Skurdal
(74) *Attorney, Agent, or Firm* — Hovey Williams LLP

(57) ABSTRACT

A method of fabricating a bonded cascade assembly of a thrust reverser for an aircraft nacelle. The method may include inserting individual turning vanes between spaced apart elongated stiffeners at an aft end thereof and sliding the turning vanes toward a front frame piece attached to or integrally formed with forward ends of the elongated stiffeners. The elongated stiffeners may have inner and outer flanges for trapping and limiting radial movement of the turning vanes. The method may further include bonding the turning vanes to the structural frame with a structural adhesive and attaching a closeout cap to the aft ends of each of the elongated stiffeners.

17 Claims, 9 Drawing Sheets

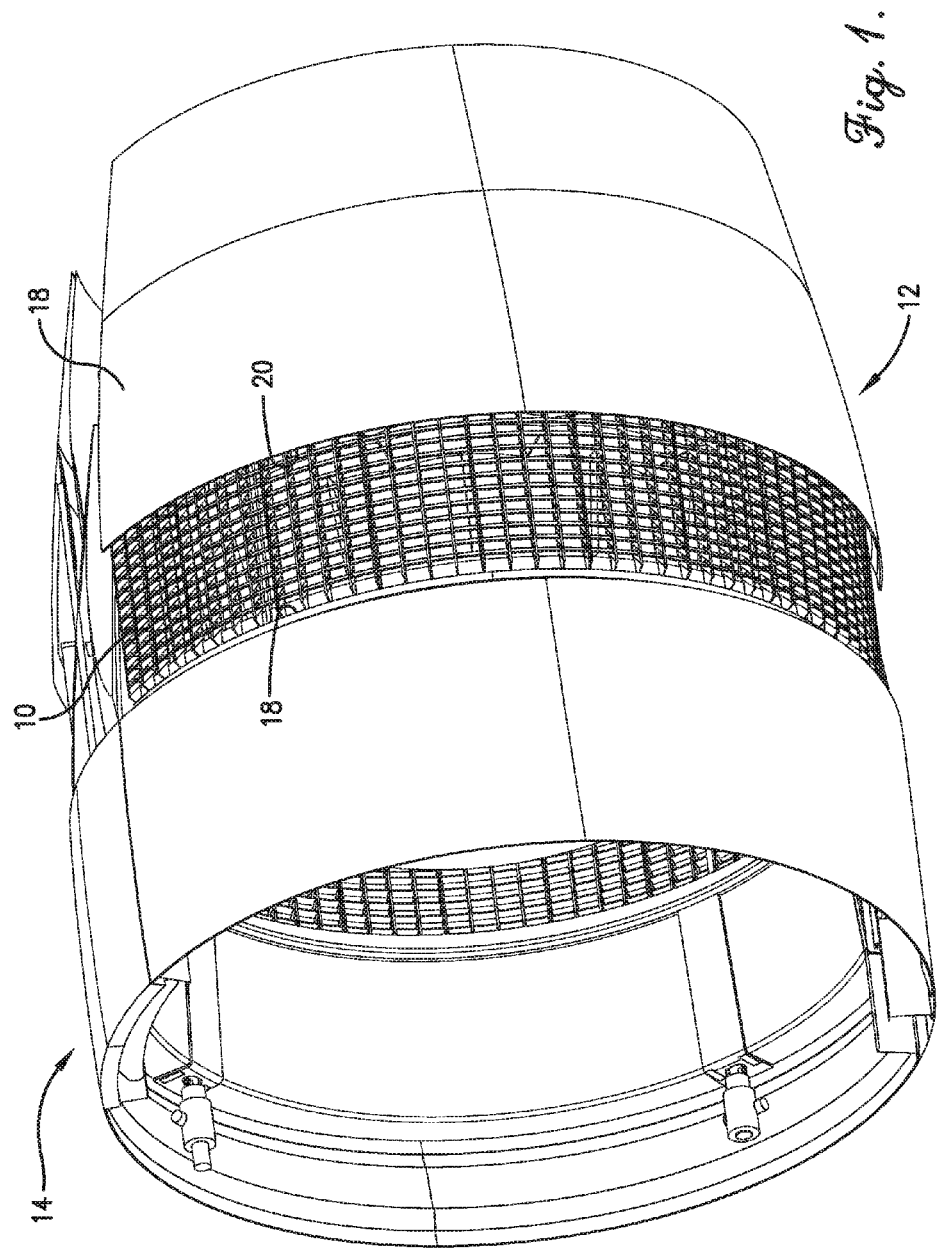

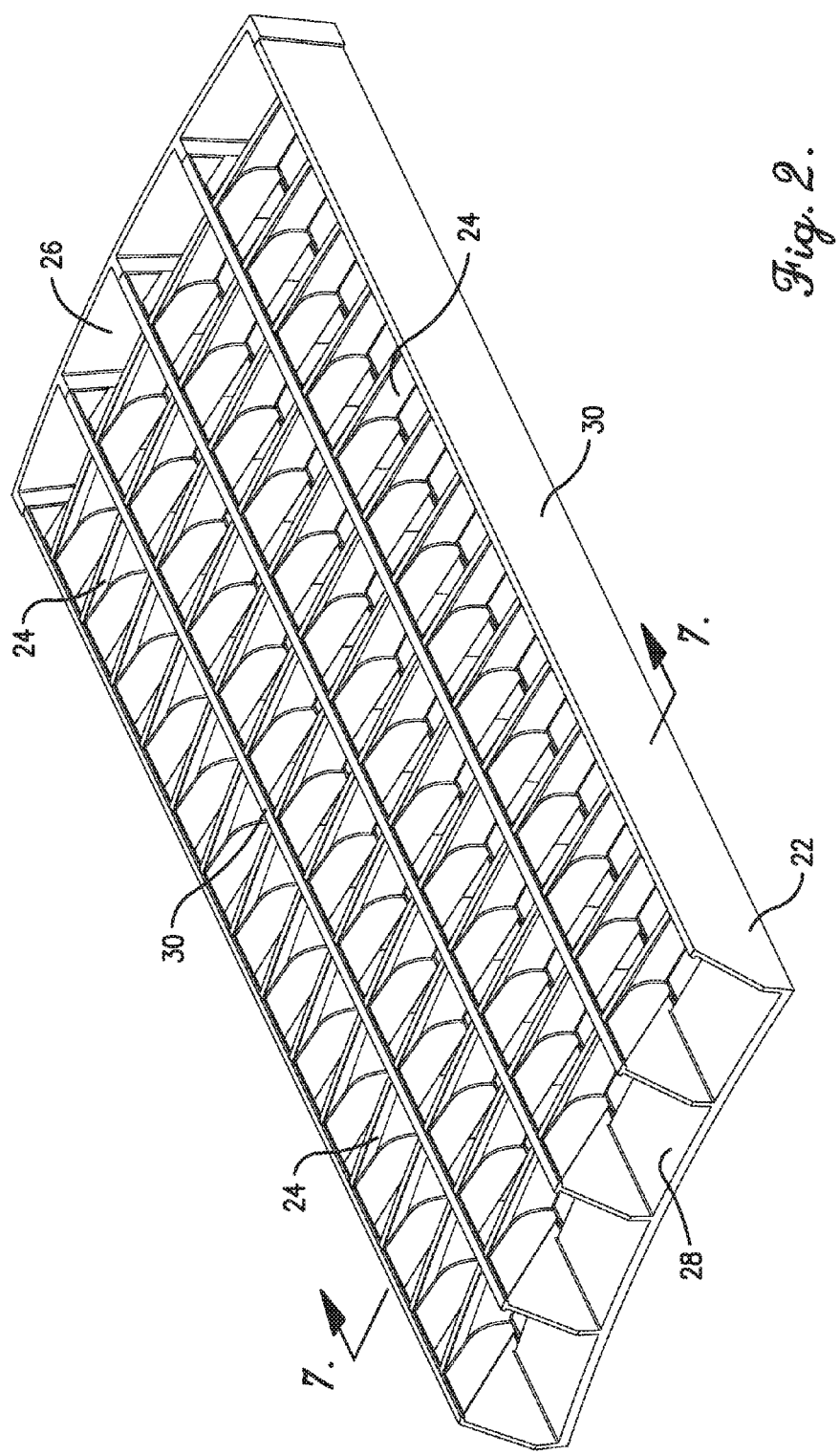

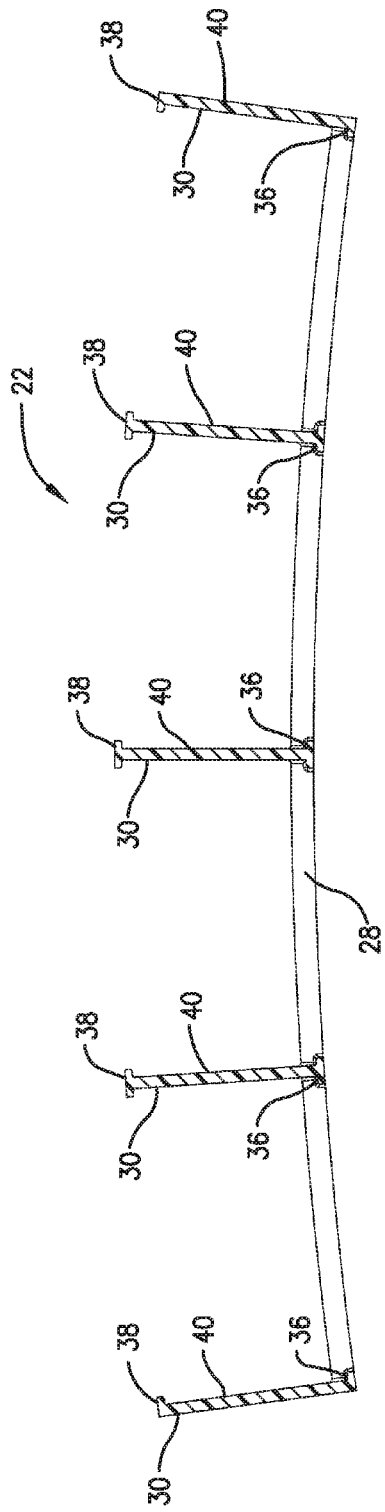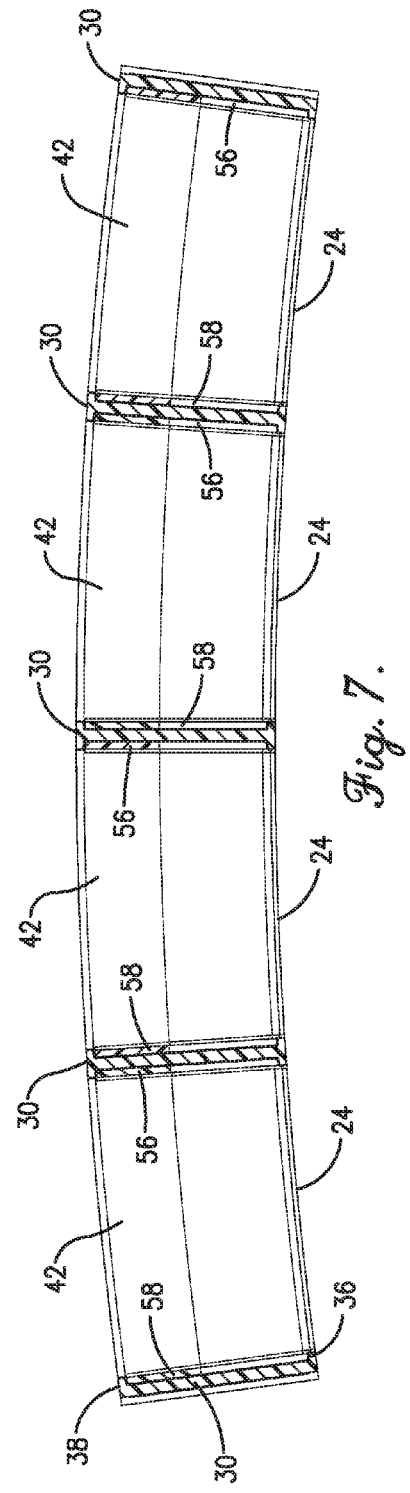

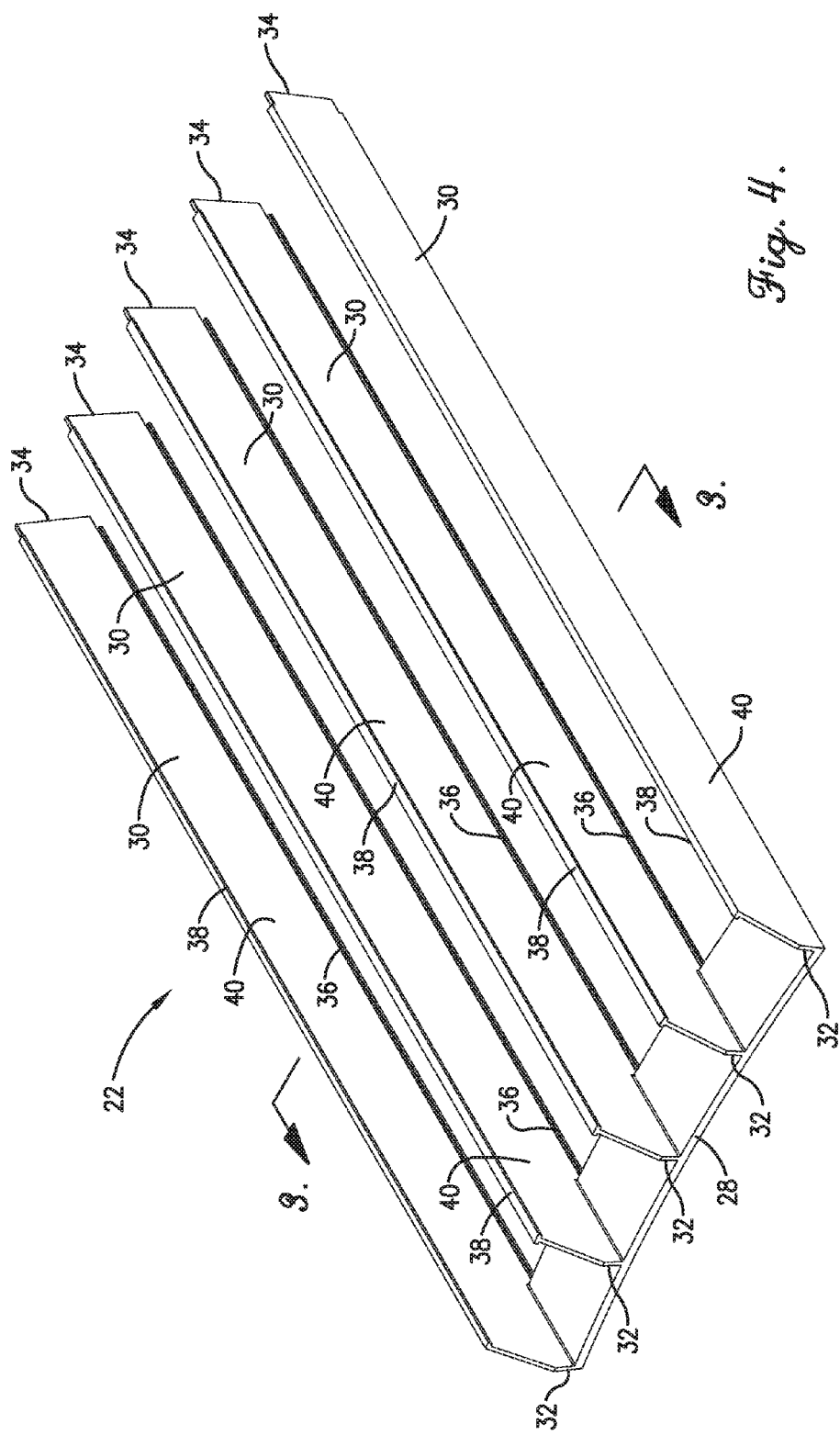

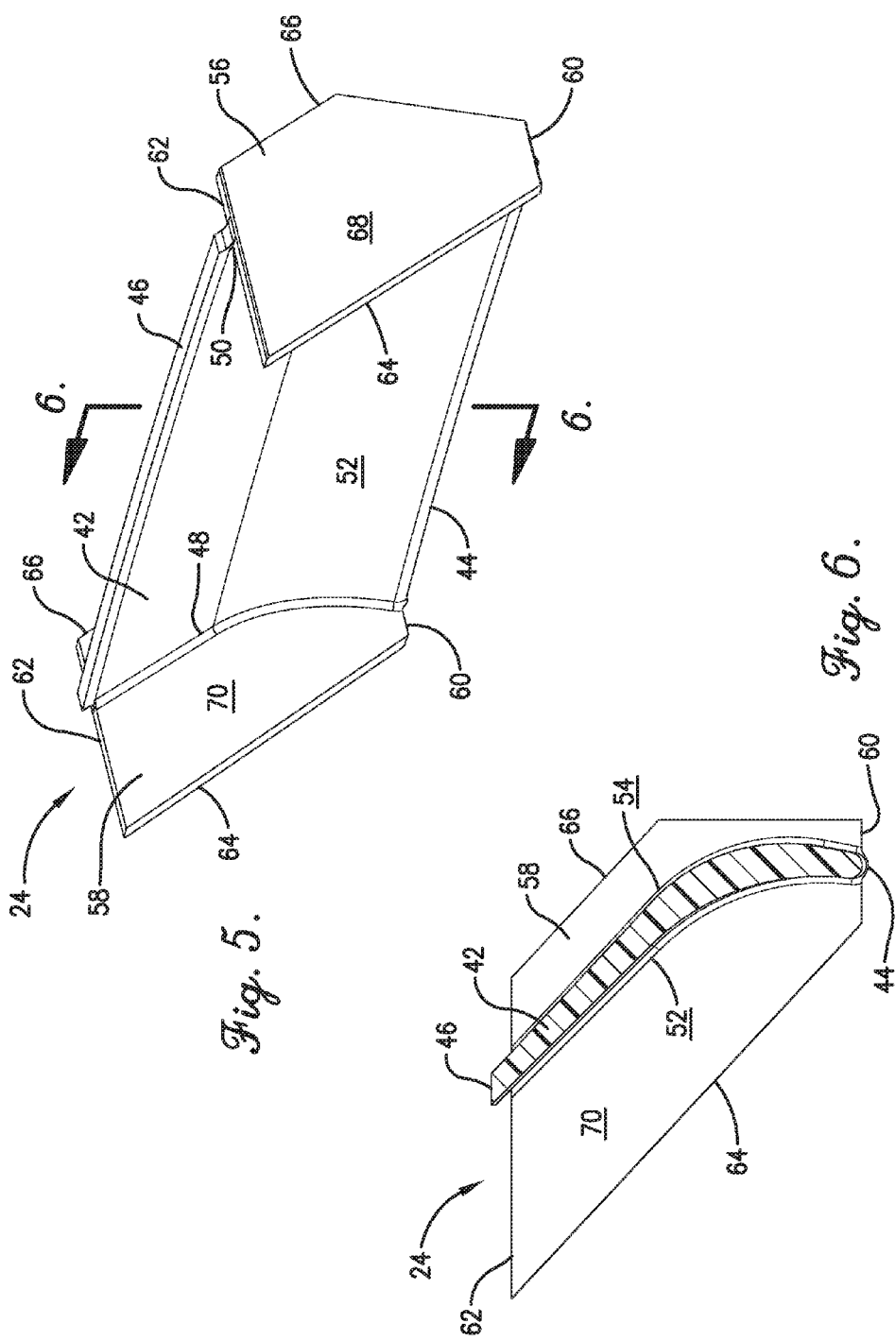

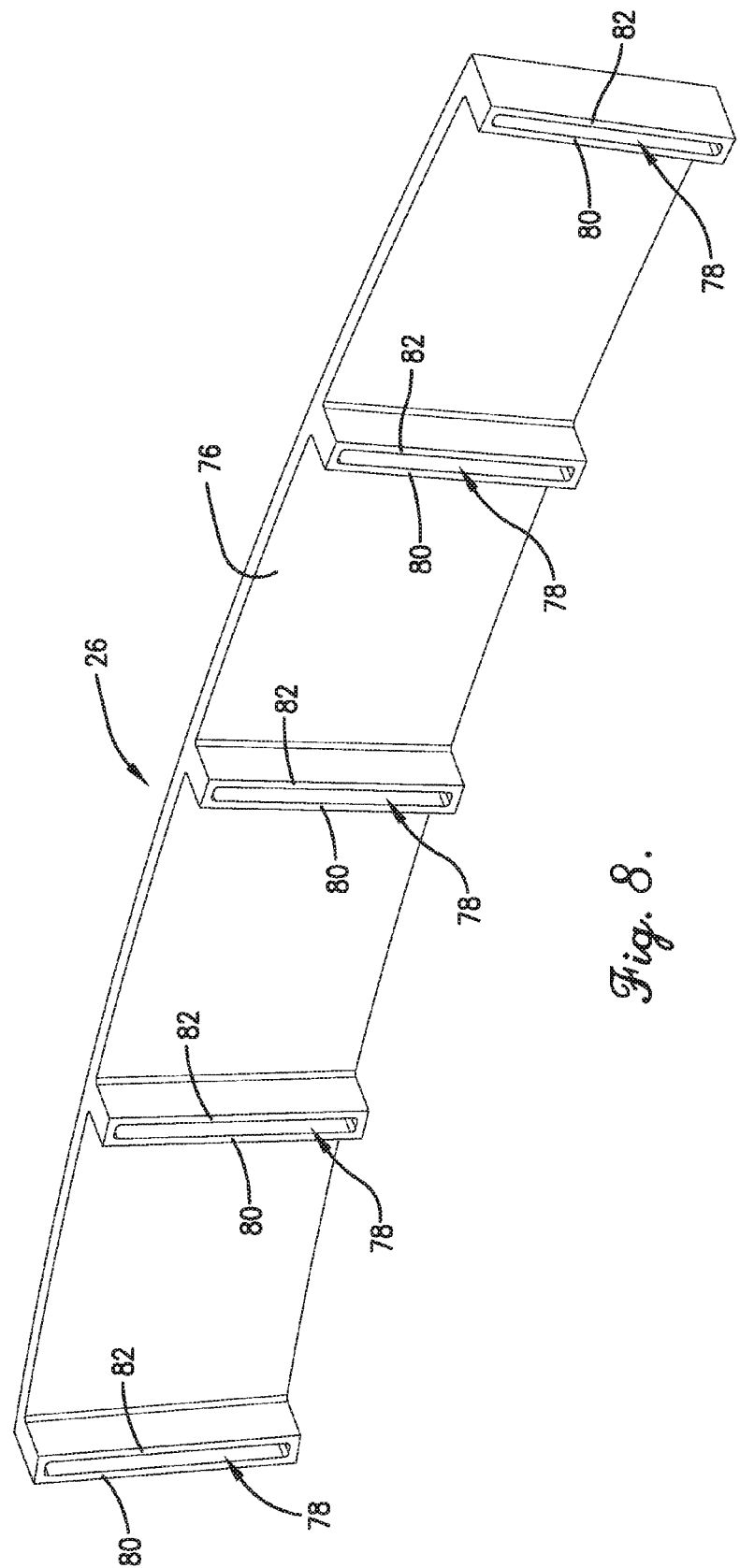

US 9,803,587 B1

METHOD OF FABRICATING A BONDED CASCADE ASSEMBLY FOR AN AIRCRAFT THRUST REVERSER

RELATED APPLICATIONS

This patent application is a continuation application, and claims priority benefit with regard to all common subject matter, of earlier-filed U.S. patent application Ser. No. 14/305,444, filed on Jun. 16, 2014, and entitled "METHOD OF FABRICATING A BONDED CASCADE ASSEMBLY FOR AN AIRCRAFT THRUST REVERSER". The Ser. No. 14/305,444 patent application is a non-provisional, and claims priority benefit with regard to all common subject matter, of U.S. Provisional Patent Application No. 61/837,032, filed on Jun. 19, 2013, and entitled "BONDED CASCADE ASSEMBLY FOR AIRCRAFT THRUST REVERSER". The identified earlier-filed non-provisional and provisional patent applications are hereby incorporated by reference in their entireties into the present application.

BACKGROUND

Most commercial jet aircraft engines employ thrust reversers to aid in stopping the aircraft during landing. Aircraft with under-wing-mounted engines typically use a translating sleeve cascade thrust reverser. A translating sleeve cascade thrust reverser includes an outer sleeve covering a fan duct portion of the engine. In use, the outer sleeve translates in an aft direction, dropping down a series of doors to block fan duct air and, in sequence, exposing a series of cascades or turning vanes that redirect the fan duct air outward and forward to reverse the thrust of the engine. The cascades may also feature side turning flow geometry to prevent hot fan duct air impingement onto critical aircraft structures. The cascades may be grouped and fixed together in several cascade baskets or assemblies.

The individual cascade baskets are positioned radially around the engine's nacelle and are mounted to a fixed structure of the thrust reverser via a forward and aft mount or attach ring. While the fan duct air flows through the cascades, a pressure load is created on their baskets and ultimately reacted into the forward and aft mounts. The individual cascade baskets must provide sufficient stiffness to prevent excessive out of plane bending. Furthermore, if side turning flow geometry is present, a lateral load will exist and the cascade baskets must adequately resist "racking" loads. Cascade baskets are traditionally fabricated using metals. Some cascade baskets are made from composite materials, which are generally lighter and more durable, but generally require a labor intensive fabrication that is more expensive than fabricating traditional metal cascade baskets.

Accordingly, there is a need for improved methods of fabricating cascade thrust reversers.

SUMMARY

Embodiments of the present invention provide a bonded cascade assembly of a thrust reverser for an aircraft engine nacelle and methods of fabricating the bonded cascade assembly. The bonded cascade assembly may include a structural frame, a plurality of turning vanes, and a closeout cap. The structural frame may include a plurality of elongated stiffeners with forward and aft ends and a front frame piece attached to or integrally-formed with the forward ends of the elongated stiffeners. The turning vanes may each be positioned between two of the elongated stiffeners, forming a cascade of turning vanes shaped and angled for directing airflow from within the nacelle in a generally outward and forward direction. The turning vanes may be attached to the elongated stiffeners by structural adhesive and may also each have a geometry configured for cooperatively preventing or limiting radial movement of the turning vanes positioned therebetween. The closeout cap may be attached at the aft ends of the elongated stiffeners.

Other embodiments of the invention provide a method of fabricating a bonded cascade assembly of a cascade thrust reverser of an aircraft engine nacelle. The method may include the step of inserting a plurality of turning vanes between a plurality of elongated stiffeners at an aft end thereof and sliding the turning vanes toward a front frame piece attached to or integrally formed with forward ends of the elongated stiffeners. The elongated stiffeners may be held in spaced apart from each other by the front frame piece attached to or integrally formed with the forward ends of the elongated stiffeners. The method may further include the steps of bonding the turning vanes to the structural frame with a structural adhesive and attaching a closeout cap to the aft ends of each of the elongated stiffeners. The step of attaching the closeout cap to the aft ends of the elongated stiffeners may include sliding the aft ends between pairs of positioning flanges of the closeout cap and mechanically attaching the closeout cap and/or using structural adhesive to bond the closeout cap to the elongated stiffeners.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 1 is a perspective view of an aircraft nacelle having a thrust reverser with bonded cascade assemblies constructed in accordance with an embodiment of the present invention;

FIG. 2 is a perspective view of one of the bonded cascade assemblies of FIG. 1;

FIG. 3 is a cross-sectional elevation view of a structural frame of the bonded cascade assembly of FIG. 2;

FIG. 4 is a perspective view of the structural frame of FIG. 3;

FIG. 5 is perspective view of one of a plurality of turning vanes of the bonded cascade assembly of FIG. 2;

FIG. 6 is a cross-sectional perspective view of the turning vane of FIG. 5;

FIG. 7 is a cross-sectional view of the bonded cascade assembly taken along line 7-7 in FIG. 2;

FIG. 8 is a perspective view of a closeout cap of the bonded cascade assembly of FIG. 2;

Figure 9:
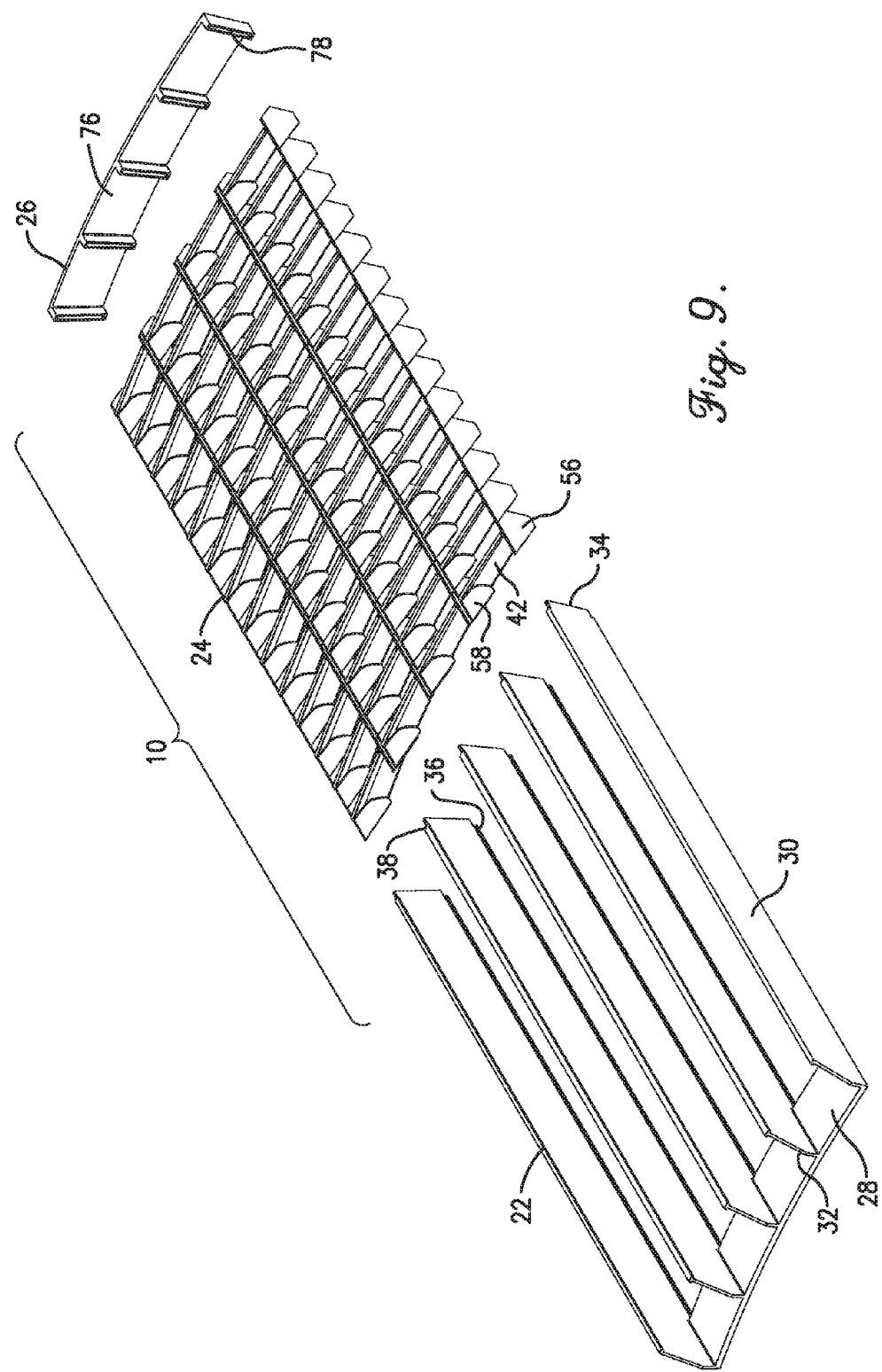
FIG. 9 is an exploded view of the bonded cascade assembly of FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention include a bonded cascade assembly 10 and method of fabrication thereof. The bonded cascade assembly is a component of a thrust reverser 12 on an aircraft engine nacelle 14, as illustrated in FIG. 1. The bonded cascade assembly 10 may be disposed between a translating sleeve 16 and an engine (not shown) housed within the nacelle 14, and may have fore and aft ends 18, 20 fixedly attached to fixed elements of the nacelle 14. As illustrated in FIG. 1, the thrust reverser 12 may have multiple bonded cascade assemblies 10, fabricated as described herein, which cooperatively circumscribe a fan exhaust duct of the nacelle 14. When the translating sleeve 16 is translated aftward, the bonded cascade assembly 10 may function to redirect air within the nacelle 14 in a generally outward and forward direction.

As illustrated in FIG. 2, the bonded cascade assembly 10 may comprise a structural frame 22, a plurality of turning vanes 24, and a closeout cap 26. The structural frame 22, turning vanes 24, and closeout cap 26 may be formed of composite materials, such as those known in the art of aircraft manufacturing. The turning vanes 24 are arranged in a cascade configuration and secured to the structural frame 22 utilizing structural adhesive. The closeout cap 26 is bonded or fastened to an aft end of the structural frame 22.

As illustrated in FIGS. 3 and 4, the structural frame 22 may comprise an elongated front frame piece 28 and a plurality of elongated stiffeners 30 extending afterward from the front frame piece 28 and integrally formed of one-piece construction therewith. Alternatively, the front frame piece 28 may be formed separately and attached or bonded to the elongated stiffeners 30. The elongated stiffeners 30 may be substantially parallel with each other and spaced a distance apart from each other. In some embodiments of the invention, the structural frame 22 may be formed using resin transfer molding, compression molding, or pultrusion. Pultrusion, as used herein, is essentially the extrusion of composite materials and is a term well-known in the art of composite manufacturing. In some embodiments of the invention, some excess material between the elongated stiffeners 30 may be cut after the formation thereof, leaving behind only enough material between the stiffeners to serve as the front frame piece 28, as illustrated in FIG. 4.

The elongated stiffeners 30 may each have a front end 32 at which the front frame piece 28 is integrally attached and an aft end 34 at which the turning vanes 24 are inserted into the frame structure 22 and then slid forward, as later described herein. A length of the elongated stiffeners 30 may extend substantially perpendicular to a length of the front frame piece 28, as illustrated in FIG. 4. Furthermore, in some embodiments of the invention, the front frame piece 28 may have a slight curve to its shape corresponding to a curve of the nacelle 14 to which the front frame piece 28 is mounted, as illustrated in FIG. 1.

The elongated stiffeners 30 may each have a configuration designed to cooperatively trap the turning vanes 24 in both radial and circumferential directions relative to the nacelle 14. In some embodiments of the invention, each of the elongated stiffeners 30 may have inner and outer flanges 36,38 with a wall 40 or webbing extending therebetween. The inner and outer flanges 36,38 may be configured to trap the turning vanes 24 in the radial direction and provide a redundant load path in addition to the adhesive bonding of the turning vanes 24 to the structural frame 22. For example, the elongated stiffeners 30 may have an I-beam configuration, as illustrated in FIG. 3, or may alternatively present an hourglass shape or C-shaped channels for locating the turning vanes 24 therebetween. The inner and outer flanges 36,38 are preferably small (i.e., extend only a small distance into the space between the elongated stiffeners 30) compared with the overall dimensions of the elongated stiffeners 30. In this way, the inner and outer flanges 36,38 have a minimal impact on weight and airflow of the bonded cascade assembly 10.

As illustrated in FIGS. 5 and 6, the turning vanes 24 may comprise any flat, slanted, or curved configuration known in the art of cascade thrust reversers. The turning vanes 24 may be formed of composite material using any composite fabrication methods known in the art. Specifically, the turning vanes 24 may be injection molded, compression molded, transfer molded, or otherwise formed as a single piece and cut apart. Alternatively, the turning vanes 24 may be injection molded, compression molded, transfer molded, or otherwise formed individually and independently. A variety of molds could be used to form the turning vanes 24 and may be shaped to accommodate various flow features determined by aerodynamic analysis and tests for a particular aircraft.

The turning vanes 24 may each comprise a flow-directing portion 42 slanted, curved, or otherwise configured for directing air from within the nacelle 14 in the forward and outward direction. The flow-directing portions 42 may each have inner edges 44, outer edges 46, opposing side edges 48,50, a forward face 52, and an aftward face 54. The turning vanes 24 may further each comprise two positioning flanges 56,58 integrally formed at the opposing side edges 48,50 of the flow-directing portion 42. The positioning flanges 56,58 may each have an inner edge 60, an outer edge 62, a forward edge 64, an aftward edge 66, and opposing side faces 68,70.

The positioning flanges 56,58 may be configured to slide between the inner and outer flanges 36,38 of the structural frame's elongated stiffeners 30, as illustrated in FIG. 7, with one of the faces 68,70 of each of the positioning flanges 56,58 abutting the wall 40 or webbing of one of the elongated stiffeners 30. The inner and outer edges 60,62 of the positioning flanges 56,58 may abut the inner and outer flanges 36,38 of the elongated stiffeners 30. Furthermore, when a plurality of the turning vanes 24 are slid into the structural frame 22, the forward and aftward edges 64,66 of their positioning flanges 56,58 may abut against each other. For example, the aftward edge 66 of the positioning flanges 56,58 of a first one of the turning vanes 24 may abut the forward edge 64 of the positioning flanges 56,58 of a second one of the turning vanes 24 placed behind and adjacent to the first one of the turning vanes 24, as illustrated in FIGS. 2 and 9.

The geometric shape and size of the positioning flanges 56,58, such as the angle at which the edges 60-66 of the positioning flanges 56,58 meet, may affect the angle at which the flow-directing portions 42 are fixed within the structural frame 22, in addition to the actual shape and location of the individual flow-directing portions 42 relative to the positioning flanges 56,58. That is, the flanges 56,58 may be configured to properly clock the turning vanes 24 in the correct attitude during insertion and cure, due to the interaction of the positioning flanges 56,58 with each other and the trapped geometry between components of the structural frame 22 and the closeout cap 26. Furthermore, in some embodiments of the invention, clocking features may be molded, cut, or otherwise formed into the positioning flanges 56,58, such as mating indentions and protrusions, to assist in properly aligning the turning vanes 24 relative to each other within the structural frame 22.

The closeout cap 26, as illustrated in FIG. 8, may be molded or otherwise formed of a rigid material, such as composite material, and may be configured to match the aft ends 34 of the elongated stiffeners 30. Specifically, the closeout cap 26 may be compression molded, transfer molded, injection molded, pultruded, or otherwise integrally formed of one-piece construction and may comprise an elongated strip 76 of rigid material and a plurality of slots 78 formed therein. For example, the slots 78 may be formed directly in the elongated strip 76 of the closeout cap 26 or formed by end cap flanges 80,82 extending substantially perpendicularly from the elongated strip 76 and spaced apart by an amount corresponding to the size and configuration of the elongated stiffeners 30. In some embodiments of the invention, the elongated strip 76 of the closeout cap 26 may be slightly curved to correspond to the shape and/or curvature of the nacelle 14 to which the closeout cap 26 is configured to be mounted.

Figure 10:
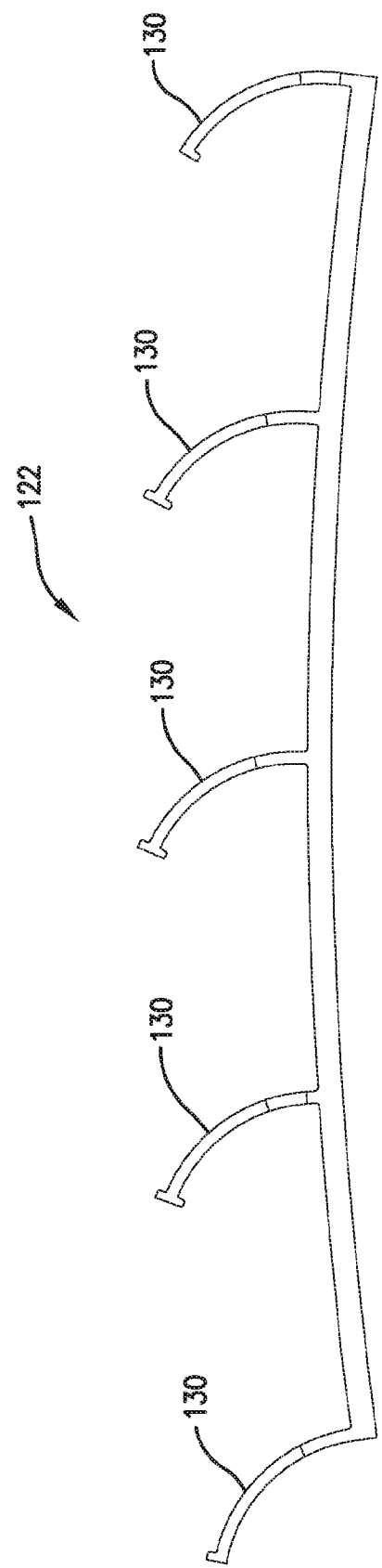
FIG. 10 is a cross-sectional elevation view of an alternative embodiment of the structural frame configured for side-turning flow.

In one alternative embodiment of the invention, as illustrated in FIG. 10, the structural frame 22 may be replaced with an alternative structural frame 122 having alternative elongated stiffeners 130 that are angled or curved in a slightly sideways or circumferential direction. This configuration may direct some of the airflow from within the nacelle 14 in a circumferential or sideways direction. The alternative structural frame 22 may require alternative turning vanes (not shown) with a matching curvature of side edges and/or flanges.

A method of fabricating the bonded cascade assembly 10, as illustrated in FIG. 9, may generally comprise individually forming the structural frame 22, the turning vanes 24, and the closeout cap 26 from composite materials and sliding the turning vanes 24 into the structural frame 22 in an aft-to-forward direction toward the front frame piece 28. Then the closeout cap 26 may be attached to an aft end of the structural frame 22.

Figure 11:
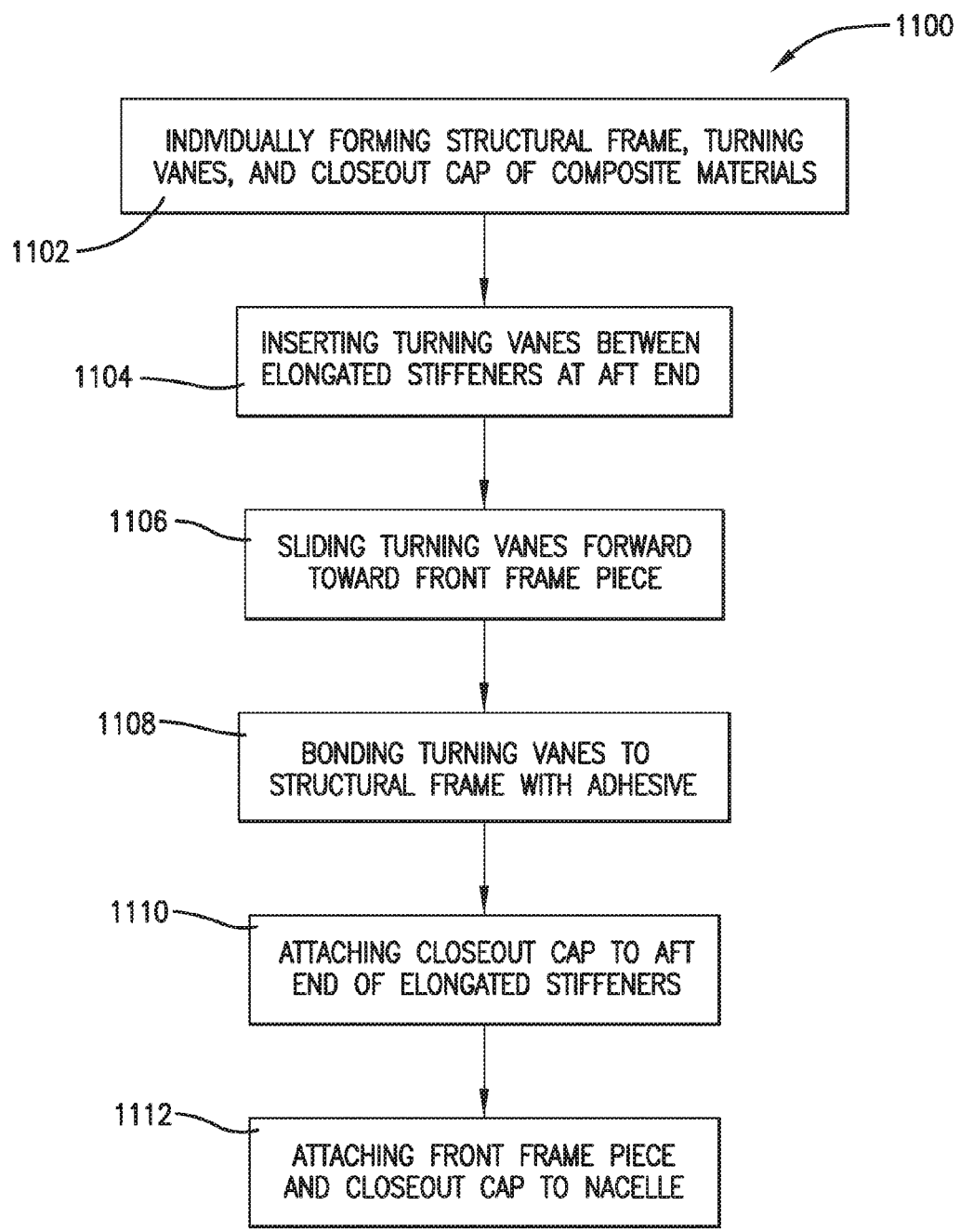
FIG. 11 is a flow chart depicting steps in a method of fabricating a bonded cascade assembly in accordance with an embodiment of the present invention.

The flow chart of FIG. 11 depicts the steps of an exemplary method 1100 for fabricating the bonded cascade assembly 11. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved.

As illustrated in FIG. 11, the method 1100 of fabricating the bonded cascade assembly 10 may first include a step of molding, injection molding, and/or pultruding composite material to form each of the components of the bonded cascade assembly 10 described herein, as depicted in block 1102. Next, the method 1100 may include the steps of inserting the turning vanes 24 between the elongated stiffeners 30 at the aft ends 34 of the elongated stiffeners 30, as depicted in block 1104, and sliding the turning vanes 24 in a direction from the aft ends 34 of the elongated stiffeners 30 toward the front frame piece 28, as depicted in block 1106. As noted above, the elongated stiffeners 30 each have a geometry configured for cooperatively preventing or limiting radial movement of the turning vanes 24 slid therebetween. That is, the inner and outer flanges 36,38 or other protruding portions of the elongated stiffeners 30 may prevent radial movement of the positioning flanges 56,58 relative to the nacelle 14.

The method 1100 may further comprise the steps of bonding the turning vanes 24 to the structural frame 22 with the structural adhesive, as depicted in block 1108, and attaching the closeout cap 26 to the aft ends 34 of each of the elongated stiffeners 30, as depicted in block 1110. Specifically, the structural adhesive may be applied onto the positioning flanges 56,58 of the turning vanes 24 and/or the elongated stiffeners 30 prior to steps 1002 and 1004, or may be otherwise injected between the turning vanes 24 and the elongated stiffeners 30 after steps 1002 and 1004. Once all the turning vanes 24 have been inserted and bonded to the elongated stiffeners 30, the closeout cap 26 is bonded or mechanically fastened to the structural frame 22 to close out the frame structure. For example, the aft ends 34 of the elongated stiffeners 30 may be slid between adjacent pairs of the end cap flanges 80,82 and mechanically attached thereto or bonded thereto using structural adhesive or any other method known in the art.

In some embodiments of the invention, the method 1100 may additionally include the steps of mechanically mounting or otherwise attaching the front frame piece 28 and the closeout cap 26 to fixed structural elements of the nacelle 14 and/or thrust reverser 12, as depicted in block 1112. The method 1100 may be repeated multiple times to form the thrust reverser 12, since the thrust reverser 12 may typically include a plurality of cascade assemblies.

Advantageously, the present invention provides most of the benefits of a monolithic composite cascade assembly utilizing a more automated approach to fabrication and presumably a lower cost product. Specifically, having the front frame piece integrally formed with the elongated stiffeners provides the strength of a monolithic cascade assembly at the forward end, which experiences the most longitudinal load. Meanwhile, little to no longitudinal load is exerted at the aft end of the bonded cascade assembly, where the closeout cap is separately attached. Thus, the separately-formed turning vanes and closeout cap alleviate the manufacturing complexities of a completely monolithic cascade assembly without sacrificing the strength of the monolithic cascade assembly.

Although the invention has been described with reference to the preferred embodiment illustrated in the attached drawing figures, it is noted that equivalents may be employed and substitutions made herein without departing from the scope of the invention as recited in the claims. For example, in some alternative embodiments of the invention, the front frame piece 28 could actually be the closeout cap 26, and the aft ends 34 of the elongated stiffeners 30 could have an integrally-formed aft frame piece (not shown). In this alternative embodiment, the turning vanes 24 could be inserted from the front ends 32 of the elongated stiffeners 30 and slid toward this aft frame piece during fabrication of the bonded cascade assembly.

Having thus described various embodiments of the invention, what is claimed as new and desired to be protected by Letters Patent includes the following:

1. A method of fabricating a cascade assembly, the method comprising:
    attaching a plurality of turning vanes to a structural frame, the structural frame comprising a plurality of elongated stiffeners each having forward and aft ends and inner and outer flanges between which at least portions of the turning vanes are located after the turning vanes are attached to the structural frame, the inner and outer flanges being configured for cooperatively preventing or limiting radial movement of the turning vanes positioned therebetween, and a frame piece attached to or integrally formed with the forward or aft ends of the elongated stiffeners; and
    attaching a closeout cap to each of the elongated stiffeners at the aft or forward ends opposite of the frame piece.

2. The method of claim 1, wherein the elongated stiffeners and the frame piece are made of composite material integrally formed of one-piece construction by molding or pultrusion.

3. The method of claim 1, wherein the turning vanes are formed of one-piece construction by molding composite material.

4. The method of claim 1, wherein the closeout cap is made of composite material integrally formed of one-piece construction by molding, injection molding, or pultrusion.

5. The method of claim 1, wherein the closeout cap comprises end cap flanges configured for cooperatively preventing or limiting circumferential movement of the elongated stiffeners positioned therebetween during the step of attaching the closeout cap.

6. The method of claim 1, wherein the closeout cap is bonded to the elongated stiffeners with structural adhesive.

7. The method of claim 1, wherein the turning vanes comprise flow-directing portions with opposing side edges and opposing positioning flanges extending forward and aft from the side edges of the flow-directing portions, wherein the elongated stiffeners are configured to cooperatively trap the positioning flanges circumferentially and radially after the step of attaching the turning vanes and the frame piece and the closeout cap are configured to cooperatively trap the turning vanes therebetween after the step of attaching the closeout cap.

8. The method of claim 7, wherein the positioning flanges comprise forward and aft edges configured to abut forward or aft edges of adjacent ones of the positioning flanges when positioned within the structural frame, such that a resulting trapped geometry of the positioning flanges within the elongated stiffeners properly clocks the flow-directing portions in a desired attitude relative to the structural frame.

9. A method of fabricating a cascade assembly of a cascade thrust reverser of an aircraft engine nacelle, the method comprising:
    attaching turning vanes between elongated stiffeners of a structural frame, the elongated stiffeners each having forward and aft ends and inner and outer flanges or protruded portions between which at least portions of the turning vanes are located after the turning vanes are attached between the elongated stiffeners, the inner and outer flanges or protruded portions being configured for cooperatively preventing or limiting radial movement of the turning vanes relative to the nacelle, the elongated stiffeners being spaced from each other via a front frame piece integrally-formed with the forward ends of the elongate stiffeners; and
    attaching a closeout cap to the aft ends of each of the elongated stiffeners.

10. The method of claim 9, wherein the elongated stiffeners and the front frame piece are made of composite material integrally formed of one-piece construction by resin transfer molding, compression molding, or pultrusion, wherein the turning vanes are each individually formed of composite material by injection molding, compression molding, or transfer molding, wherein the closeout cap is made of composite material integrally formed of one-piece construction by compression molding, transfer molding, injection molding, or pultrusion.

11. The method of claim 9, wherein the closeout cap comprises end cap flanges configured for cooperatively preventing or limiting circumferential movement, relative to the nacelle, of the elongated stiffeners, wherein the step of attaching the closeout cap to the aft ends of the elongated stiffeners further comprises positioning the aft ends of the elongated stiffeners between pairs of the end cap flanges.

12. The method of claim 9, wherein the turning vanes each comprise flow-directing portions with opposing side edges and opposing positioning flanges extending forward and aft from the side edges of the flow-directing portions, wherein the elongated stiffeners are configured to cooperatively trap the positioning flanges circumferentially and radially relative to the nacelle after the turning vanes are attached to the elongated stiffeners and the front frame piece and the closeout cap are configured to cooperatively trap the turning vanes therebetween after the step of attaching the closeout cap.

13. The method of claim 12, wherein the positioning flanges comprise forward and aft edges configured to abut forward or aft edges of adjacent ones of the positioning flanges when positioned within the structural frame, such that a resulting trapped geometry of the positioning flanges within the elongated stiffeners properly clocks the flow-directing portions in a desired attitude relative to the structural frame.

14. A bonded cascade assembly of a cascade thrust reverser of an aircraft engine nacelle, the bonded cascade assembly comprising:
    a structural frame made of composite material and comprising:
        a plurality of elongated stiffeners each having a forward end and an aft end, and
        a front frame piece integrally-formed with the forward ends of the elongated stiffeners;
    a plurality of turning vanes made of composite material and each positioned between two of the elongated stiffeners and attached thereto; and
    a closeout cap made of composite material and attached at the aft ends of the elongated stiffeners.

15. The assembly of claim 14, wherein the elongated stiffeners each further include an inner flange and an outer flange, the inner flanges and the outer flanges being cooperatively configured for preventing or limiting radial movement of the turning vanes relative to the nacelle.

16. The assembly of claim 14, wherein the turning vanes each comprise flow-directing portions with opposing side edges and opposing positioning flanges extending forward and aft from the side edges of the flow-directing portions, wherein the elongated stiffeners cooperatively trap the positioning flanges circumferentially and radially relative to the nacelle, and the front frame piece and the closeout cap cooperatively trap the turning vanes therebetween.

17. A method of fabricating a cascade assembly, the method comprising:
- attaching a plurality of turning vanes to a structural frame, the structural frame comprising a plurality of elongated stiffeners each having forward and aft ends and C-channels or hourglass-shaped configurations configured for cooperatively preventing or limiting radial movement of the turning vanes, and a frame piece attached to or integrally formed with the forward or aft ends of the elongated stiffeners; and
- attaching a closeout cap to each of the elongated stiffeners at the aft or forward ends opposite of the frame piece.

* * * * *